Dec. 30, 1941.  F. KÖBER ET AL  2,268,338
STEREOSCOPIC ATTACHMENT FOR PROJECTORS
Filed Feb. 24, 1939  3 Sheets-Sheet 1
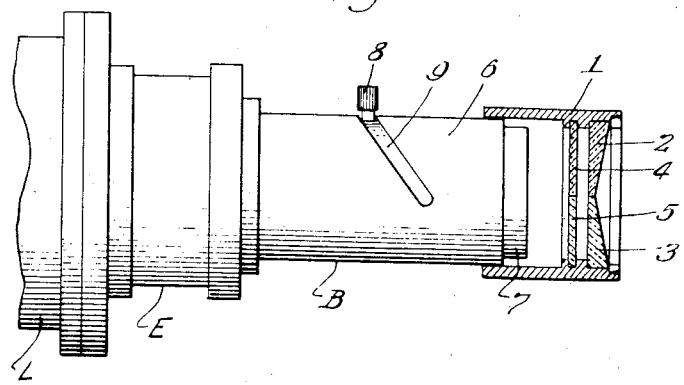
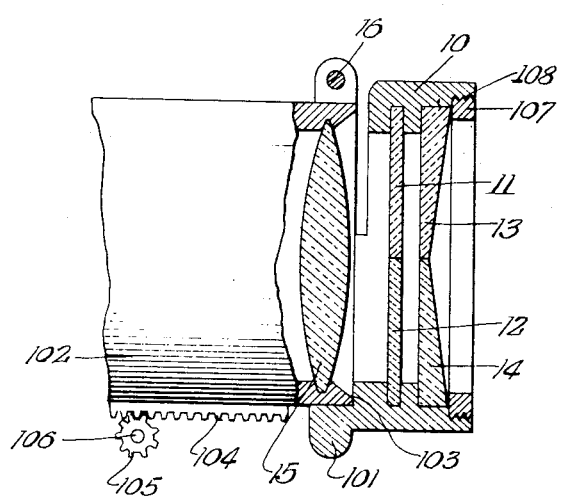
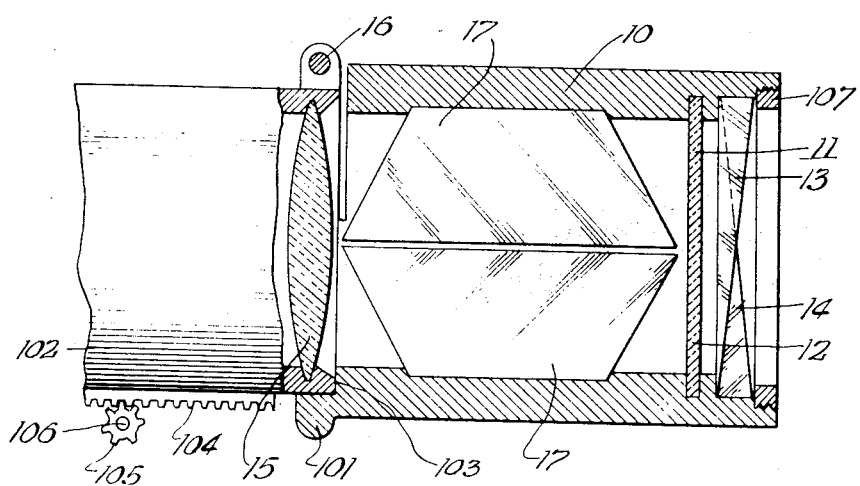
Inventors
Fritz Köber
Kurt Hoffmann Inventors
Fritz Köber
Kurt Hoffmann

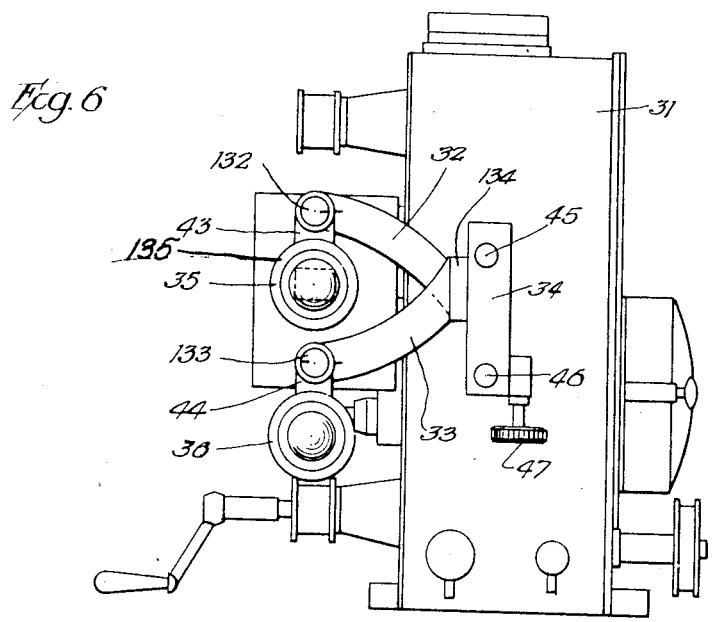
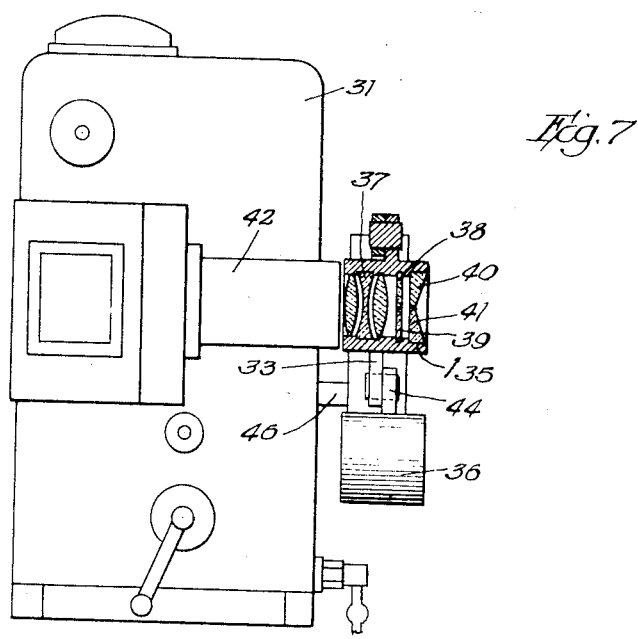

Patented Dec. 30, 1941

2,268,338

UNITED STATES PATENT OFFICE 2,268,338

STEREOSCOPIC ATTACHMENT FOR PROJECTORS

Fritz Köber and Kurt Hoffmann, Dresden, Germany, assignors to Zeiss Ikon Aktiengesellschaft, Dresden, Germany Application February 24, 1939, Serial No. 258,301
In Germany February 25, 1938

6 Claims. (Cl. 88—16.6)

This invention relates to a device for selectively projecting ordinary pictures or stereo-pictures respectively by means of the ordinary still projecting apparatus, or by means of a standard motion picture projector.

The invention has the object of facilitating the conversion of the ordinary projection apparatus into an apparatus for projecting stereoscopic pictures, and vice versa.

Another object of the invention is to permit of this rapid conversion by means of a readily removable attachment for a projection apparatus of the desired type.

It is also an object of the invention to facilitate this conversion of one type of projection apparatus into another type without interfering with the focal adjustability of the projection apparatus.

The invention also has the object of providing attachments for ordinary projectors for converting them into stereoscopic projectors, some of which attachments may be applied to rotary mounts for the projector objectives, while other attachments are suitable for being positioned on objectives adapted to be focused by rectilinear movement.

Another object of the invention is to provide an attachment of the type referred to, which is also suitable for converting an ordinary projector into a projector adapted to produce a single record from two stereoscopic mirror-inverted pictures of the same object.

The invention, furthermore, has the object of providing an attachment for the conversion of ordinary still projectors or ordinary motion picture projectors into stereoscopic projectors by permitting the substitution of a suitable optical attachment for the optical equipment of the respective standard projectors.

Several embodiments of the invention are illustrated in the accompanying drawings to which reference is made in the following description of the invention.

In the drawings:

Fig. 1 is partly a side elevation and partly a section of portions of a projector having a rotary adjustment for the lens, and provided with stereoscopic removable equipment.

Fig. 2 shows in side elevation and partly in section an attachment applied to the mount of a lens which is rectilinearly adjustable for focal variation.

Fig. 3 shows partly in side elevation and partly in section, an attachment applied to a lens mount which can be adjusted rectilinearly, the attachment being suitable for projecting stereoscopic mirror-inverted pictures.

Fig. 6 shows in front elevation a motion picture projector with an attachment for selective use as an ordinary or a stereoscopic projector, respectively; and Fig. 7 is partly a side elevation and partly section of the device illustrated in Fig. 6.

Figure 4:
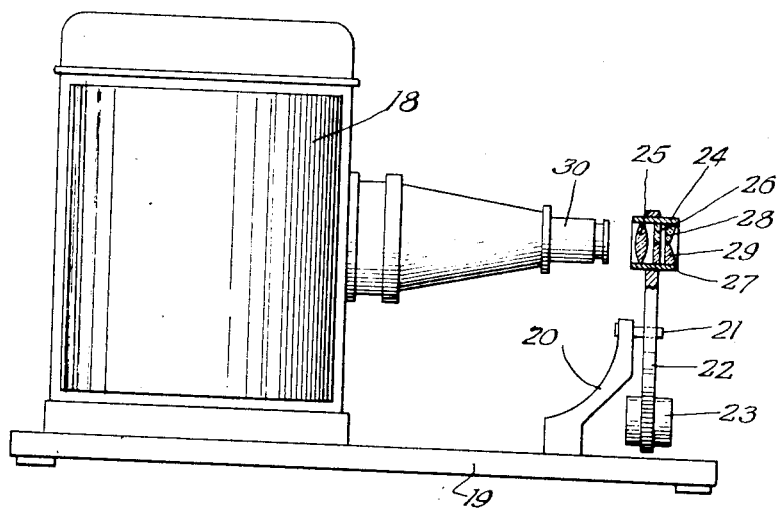
Fig. 4 shows in side elevation and partly in section a projector for still pictures, with an attachment—not carried by the mount of the lens —for selectively using it as an ordinary or a stereoscopic projector, respectively.

In the embodiment illustrated in Fig. 1, the lamp housing of the projector indicated at L may be provided with a tubular extension E to which a bearing sleeve B for the mount 7 of a projecting lens, not illustrated, is secured. The mount 7 is adjustable rotatably with respect to the bearing sleeve B in a manner well known in the art, whereby through rotary adjustment of said mount, the focal distance may be varied to produce a sharp image on a screen. The rotary adjustment of the lens mount 7 with respect to the bearing sleeve 6 is effected in this embodiment by means of a knob 8 projecting from the mount 7 through a cam slot 9 of the bearing sleeve, whereby upon movement of said knob within the slot 9, the mount 7 not only is rotated, but at the same time also is shifted in axial direction with respect to the lamp housing L.

The parts described form the standard equipment of an ordinary projector, as for instance, a projector for still pictures. The attachment for converting this projector into a projector for stereoscopic projection comprises a housing or mount 1 adapted to be telescoped onto the bearing sleeve 6 for the lens mount 7.

The stereoscopic attachment is provided in a well known manner with deflecting elements 2 and 3 shown in the form of prismatic wedges and with polarizing filter sections 4 and 5, said filter sections having planes of polarization at right angle to each other for the light passing therethrough.

Advisably the housing 1 is positioned on the front end of the stationary bearing sleeve 6 in such manner that it is frictionally retained thereon by its own resiliency, the fit of the annular housing 1 on the sleeve 6 being tight enough to permit the housing to be retained in adjusted position, while at the same time permitting a rotary adjustment of the attachment on the sleeve against the frictional force by means of which it is retained.

It is obvious then that upon rotary adjustment of the lens mount 7 with respect to the lamp housing L and plane of the picture to be projected (not shown), no longitudinal adjustment or rotary adjustment of the stereoscopic attachment with respect to the housing L or picture plane will occur. It is also obvious that there must be space enough between the portion of the annular housing 1 which is removably secured to the sleeve 6 and the polarizer sections 4, 5 within said attachment to permit the mount 7 to be advanced the maximum distance required for focal adjustment.

In the use of the apparatus for projecting stereoscopic pictures the attachment is placed in position and set to produce an image on the screen which is made up through registration of the projections of the two pictures of the pair. The lens mount is adjusted to render this image as sharp as may be desired. The projecting element and the stereoscopic attachment are adjustable independently of each other.

The embodiment illustrated in Fig. 2 also comprises a carrier in the form of an annulus 10 having at one end a slitted bead or reinforcement 101 which may be shifted telescopically into engagement with the end of the mount 102 for the lens 15 of the projector of which this mount only is shown. The annulus 10 for the attachment is provided with a shoulder 103 which determines the depth to which the attachment may be placed upon the front portion of the tubular mount 102. A rack bar 104 fixed to the tubular mount 102 is in engagement with a pinion 105, the shaft 106 of which is fixed with respect to the housing of the projector, not shown. Upon rotation of the pinion 105, an axial displacement of the mount 102 and lens 15, therefore, will occur, permitting the proper adjustment of the lens to throw a sharp image on the screen.

The stereoscopic attachment whereby a pair of superimposed images of juxtaposed stereoscopic pictures may be projected upon a screen (not shown), again comprises a pair of deflecting elements 13, 14 illustrated as prismatic wedges, preferably of semi-circular shape and secured within the annulus 10, and a pair of polarizing filter sections 11 and 12 associated with said wedges 13 and 14 and having their planes of polarization at right angle to each other. The prisms 13, 14 are retained in their position within the annulus 10 by means of a ring 107 having an external screw thread for insertion into a recess 108 of the annulus 10, which recess is provided with a suitable internal screw thread.

When a screw 16 extending through the slitted portion of the bead 101 is loosened, the attachment may readily be positioned upon the front end of the tubular lens mount 102 to the depth determined by the shoulder 103.

After rotary adjustment of this attachment relatively to the non-rotary tubular mount 102, the screw 16 may be tightened and any subsequent focal adjustment of the optical equipment of the projector will leave the relations between said optical equipment and the attachment for stereoscopic projection unaltered.

The attachment illustrated in Fig. 2 is adapted to convert the ordinary projector into a projector for producing registering images from a stereoscopic picture camera whose stereoscopic pairs of pictures are positioned in the ordinary upright manner, namely without mirror inversion.

The embodiment illustrated in Fig. 3 serves the purpose of producing a registering image on a screen from a pair of stereoscopic pictures which are mirror inverted with respect to each other, as for instance the left side of one picture of the pair being adjacent the left side of the other picture. The lens mount 102 again is operable for focal adjustment by the rack 104 and pinion 105 without requiring rotation of the lens. The stereoscopic attachment which now not only serves the purpose of producing a single image on a screen from two stereoscopic pictures but which also serves the purpose of correcting the mirror inversion of the stereoscopic pair of pictures comprises an annulus 109 which may be secured to the front portion of the mount 102 in the same manner as illustrated and described in Fig. 2. The annulus 109, however, also contains two additional prisms 17 of the type of the Dove prisms, the reflecting surfaces of which are disposed at an angle of 45 degrees. In this manner the mirror inverted pictures of the picture carrier are turned 90 degrees, when projected through the lens 15. This attachment also contains the polarizing filters 11 and 12 whose planes of polarization are at right angle to each other and the deflecting elements 13 and 14 again in the form of prismatic wedges secured in position by holding ring 107.

Here also it is obvious that any adjustment of the optical equipment of the standard projector as formed by the mount 102 and lens 15 may be effected independently of any rotary adjustment of the stereoscopic attachment. The stereoscopic attachment can be applied to the lens mount 102 to a predetermined depth while being rotatable adjustably with respect thereto and is adapted to be locked in the adjusted position by the screw 16.

While the embodiments illustrated in Figs. 1 to 3 permit of the application of the stereoscopic attachment directly to the bearing sleeve for the lens mount or the lens mount itself respectively, Figs. 4 to 7 show embodiments of a removable stereoscopic attachment which may be positioned in place of standard optical equipment of the projector without being supported on either of said elements.

Figure 5:
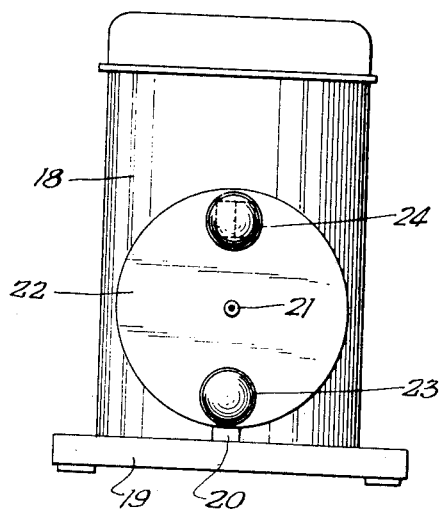
Fig. 5 shows a front elevation of the device illustrated in Fig. 4.

The projector housing 18, as shown in Figs. 4 and 5, is supported on a base 19 which also is equipped with a bracket 20 serving as a support for the attachments. This bracket 20 supports movably a holder 22 for the standard optical extension equipment 23 of the projector, the detail construction of which is of no interest for the present application. The holder 22 which, as shown in Fig. 5 has the form of a circular disc is rotatably mounted on a pin 21 projecting from the carrier bracket 20. This holder 22 also serves for supporting the stereoscopic attachment which in this instance also comprises an annulus 24 containing a lens 25 which also constitutes an optical extension of the standard projector lens (not shown). This attachment, furthermore, includes the polarizing filter sections 26, 27, and the deflecting elements 28, 29 in the form of prismatic wedges suitably secured within the annulus 24.

While in the embodiments illustrated in Figs. 1 to 3, the stereoscopic attachment may be taken off the projector and may be transported separately from the same, in the embodiment illustrated in Figs. 4 and 5, the stereoscopic attachment may remain permanently associated with the base 19 of the housing 18. The attachment formed by the annulus 24 and its contents is adapted to replace a part of the equipment used for planoscopic projection, as contrasted with the embodiments of Figs. 1 to 3 in which it is added to the optical equipment.

When it is desired to use the projector for ordinary pictures, the extension 23 is moved to operative position by adjusting the holder 22 on this carrier bracket 20 to bring the annulus 23 in axial alinement with the standard optical equipment of the projector which is mounted in the bearing sleeve 30. This optical equipment may be adjusted with respect to the bearing sleeve in any desired way to produce upon positioning of the extension 23 a sharp image on the screen. When it is desired to convert the projector 18 into a projector for stereoscopic pictures, the holder 22 is adjusted on this bracket 20 to move the annulus 24 into axial alinement with the optical equipment 30 of the projector, as shown in the drawings. The lens of the projector may be adjusted as required.

Figs. 6 and 7 illustrate the invention in association with a motion picture projecting apparatus. The housing 31 of the motion picture projector is at its front face equipped with a bracket 34 which may be slidable to any desired position parallel to the optical axis on rods 45 and 46. The rods 45 and 46 are of sufficient length to permit this bracket 34 to be shifted thereon. A plate 134 is adjustably mounted on the bracket 34, and this plate is equipped with arms 32 and 33 which diverge from the plate in upward and downward slanting direction. The free end of each of the arms 32, 33 carries a pin 132 and 133 respectively for the pivotal mounting of carriers 43 and 44 by means of which different optical equipments 35 and 36 are supported.

In the position shown in Figs. 6 and 7, the stereoscopic equipment 35 is in alinement with the bearing sleeve 42 which contains the lens or lens mount (not shown) of the motion picture projecting apparatus, and the details of which are of no importance for the present invention. The attachment 35 again comprises an annulus 135 with a compound lens 37 supported therein, while in front of said lens the annulus 135 carries the polarization filters 38 and 39 as well as the deflecting elements 40 and 41 which again are illustrated as prismatic wedges. The other mount 36 for optical equipment on the arm 44 serves as an extension or supplementary part for the optical equipment contained in sleeve 42 in a manner well known from motion picture machines.

In the position illustrated in Figs. 6 and 7, the motion picture apparatus 31 is converted by the attachment from an apparatus for projecting the usual motion pictures into an apparatus for producing registering images from stereoscopic pictures on a screen. When it is desired to use the apparatus for standard projection, the carriers 43 and 44 are rocked upwardly about the pivots 132, 133 to move the stereoscopic attachment 35 out of the optical axis and to swing the attachment 36 into the optical axis of the system. Suitable means may be provided on the arms 32, 33 or on the carriers 43, 44 or on both for indicating the proper alinement of their optical equipments selectively placeable to operative position, or yielding stops or the like well known in the art may be provided on these parts for assuring the positioning of these equipments in proper relation to the axis of the sleeve 42.

A thumb screw 47 indicated in Fig. 6, may serve for shifting the plate 34 parallel to the optical axis on the rods 45, 46 so as to permit of proper axial adjustment of that equipment 35 or 36 respectively which happens to be in operative position.

The other parts indicated in Figs. 6 and 7 may constitute the ordinary means for guiding a film past the picture window, and do not form any part of the present invention.

We claim:

1. An attachment for selectively converting an ordinary projector provided with a single projection objective into a projector for stereoscopic pictures, said attachment including a tubular holder adapted to be positioned in front and in axial alinement with the projection objective of a projector of the type described, two ray deflecting elements within said holder and mounted in a single plane for projecting two images of a stereoscopic picture projected by the said objective into superposition upon a screen, two polarizing filters, one for each said two ray deflecting elements and mounted within said tubular member so as to polarize the light rays before the latter pass through the ray deflecting elements, the polarizing plane of said polarizing filters being located at a right angle to each other, and means for removably retaining said holder in operative position in front of the projection objective, said means comprising a slotted clamping ring integrally connected with said tubular holder and adapted to be attached to the projection objective.

2. An attachment for selectively converting an ordinary projector provided with a single projection objective into a projector for stereoscopic pictures, said attachment including a tubular holder adapted to be positioned in front and in axial alinement with the projection objective of a projector of the type described, two ray deflecting elements within said holder and mounted in a single plane for projecting two images of a stereoscopic picture projected by the said objective into superposition upon a screen, two polarizing filters, one for each said two ray deflecting elements and mounted within said tubular member so as to polarize the light rays before the latter pass through the ray deflecting elements, the polarizing plane of said polarizing filters being located at a right angle to each other, and means for removably retaining said holder in operative position in front of the projection objective, said means comprising a support on which said tubular holder is mounted, and shaft means parallel to the optical axis of said projection objective for rotatably supporting said support, whereby said holder with the optical elements therein may be selectively positioned in front of and out of axial alinement respectively with the projection objective of the projector.

3. In combination with a projector having a single mount containing a projection objective, a stereoscopic attachment, a holder for said attachment, an auxiliary lens for the objective of said projector carried by said holder, and a support for the holder permanently associated with the projector on which the holder is rotatably mounted to permit selectively said auxiliary lens or said stereoscopic attachment respectively to be moved into axial alinement with the projection objective in said mount.

4. In combination with a motion picture projector having a single mount containing a projection objective, a stereoscopic attachment, an auxiliary lens for said objective, and holders for said stereoscopic attachment and auxiliary lens respectively, means for pivotally supporting said holders for moving said auxiliary lens and said stereoscopic attachment, selectively into axial alinement with said objective mount.

5. In combination with a motion picture projector having a housing and a mount containing a single projection objective, a bracket supported on said housing, arms secured to said bracket, holders pivotally carried by said arms, a stereoscopic attachment supported by one holder, an auxiliary lens for said projection objective carried by the other holder, said arms being secured on the bracket with respect to the objective mount of the projector in such position that either holder may be turned with respect to the arm on which it is supported to move the auxiliary lens or the stereoscopic attachment respectively carried thereby to operative position with respect to the objective mount when the other attachment is in inoperative position.

6. A motion picture projector having a housing, a mount containing a single projection objective, a bracket supported on said housing for movement parallel to the axis of said mount, a pair of arms carried by said brackets, a holder pivotally secured to each arm at the free end thereof, said holders carrying a stereoscopic attachment and an auxiliary lens for the said objective respectively, the arms being disposed on said bracket in such manner that either the stereoscopic attachment or the auxiliary lens may be moved into operative position in axial alinement with the mount of said projection objective.

FRITZ KOBER.
KURT HOFFMANN.